United States Patent
Braun et al.

(10) Patent No.: US 6,534,971 B1
(45) Date of Patent: Mar. 18, 2003

(54) MEASUREMENT DEVICE FOR THE NON-CONTACT DETECTION OF AN ANGLE OF ROTATION

(75) Inventors: Alexander Braun, Pforzheim (DE); Asta Reichl, Stuttgart (DE); Thomas Klotzbuecher, Rudersberg (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/937,892
(22) PCT Filed: Apr. 19, 2000
(86) PCT No.: PCT/DE00/01223
§ 371 (c)(1),
(2), (4) Date: Oct. 2, 2001
(87) PCT Pub. No.: WO00/63650
PCT Pub. Date: Oct. 26, 2000

(30) Foreign Application Priority Data

Apr. 21, 1999 (DE) .......................... 199 17 939
Feb. 24, 2000 (DE) .......................... 100 08 535

(51) Int. Cl.[7] .............................. G01D 5/14; G01B 7/30
(52) U.S. Cl. ................................ 324/207.2; 324/207.25
(58) Field of Search .................. 324/207.11, 207.13, 324/207.2, 207.21, 207.25, 251, 252; 338/324; 123/167, 406.52, 406.58

(56) References Cited

U.S. PATENT DOCUMENTS

| | | | |
|---|---|---|---|
| 5,670,875 A | * | 9/1997 | Alfors et al. ............... 324/202 |
| 6,137,288 A | * | 10/2000 | Luetzow .................. 324/207.2 |
| 6,205,866 B1 | * | 3/2001 | Ullmann et al. ....... 73/862.333 |

FOREIGN PATENT DOCUMENTS

| | | |
|---|---|---|
| DE | 40 14 885 A1 | 11/1990 |
| DE | 41 32 049 A1 | 10/1992 |
| DE | 42 33 549 A | 4/1994 |
| DE | 196 29 611 A1 | 1/1998 |
| DE | 196 35 159 A1 | 3/1998 |
| DE | 197 12 833 A1 | 10/1998 |
| DE | 197 37 999 A1 | 3/1999 |
| DE | 197 41 579 A | 3/1999 |
| DE | 197 53 775 A1 | 6/1999 |

OTHER PUBLICATIONS

Patent Abstracts of Japan vol. 17, No. 023 (P–1470), Jan. 18, 1993 & JP 04 248403 A, Sep. 3, 1992.

* cited by examiner

*Primary Examiner*—Edward Lefkowitz
*Assistant Examiner*—Reena Aurora
(74) *Attorney, Agent, or Firm*—Michael J. Striker

(57) ABSTRACT

A measuring instrument (10) for contactless ascertainment of a rotation angle is made up of a support plate (12) that is comprised of magnetically nonconductive material and serves as a rotor. A permanent magnet (15), which is embodied as planar, is disposed on the support plate (12) and its polarization direction is aligned diametrically to the axle (11). If the Hall element (20) is asymmetrically disposed, i.e. if the Hall element (20) describes an elliptical rotary motion in relation to the permanent magnet (15), then a steeply decreasing region and a flat region are produced in the curve of the output signal. No magnetic flux conducting parts are required in the measuring instrument (10). Furthermore, it is very small and relatively easy to incorporate into systems and devices.

12 Claims, 6 Drawing Sheets

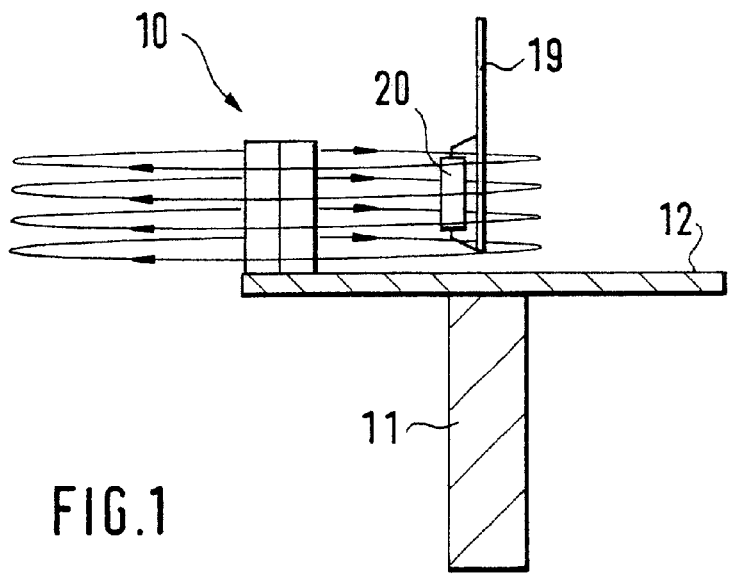
FIG.1
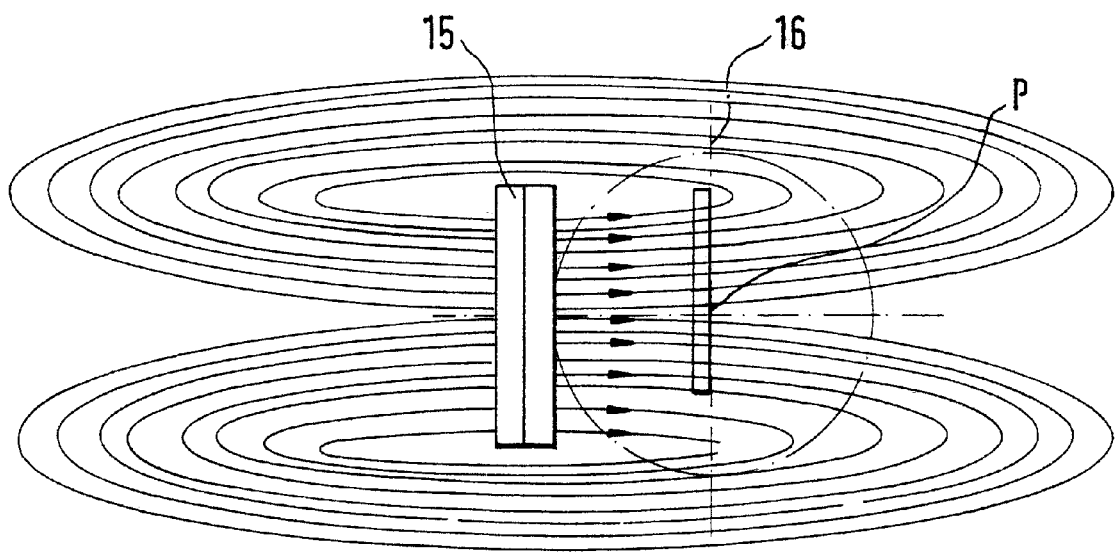
FIG.3  B = max

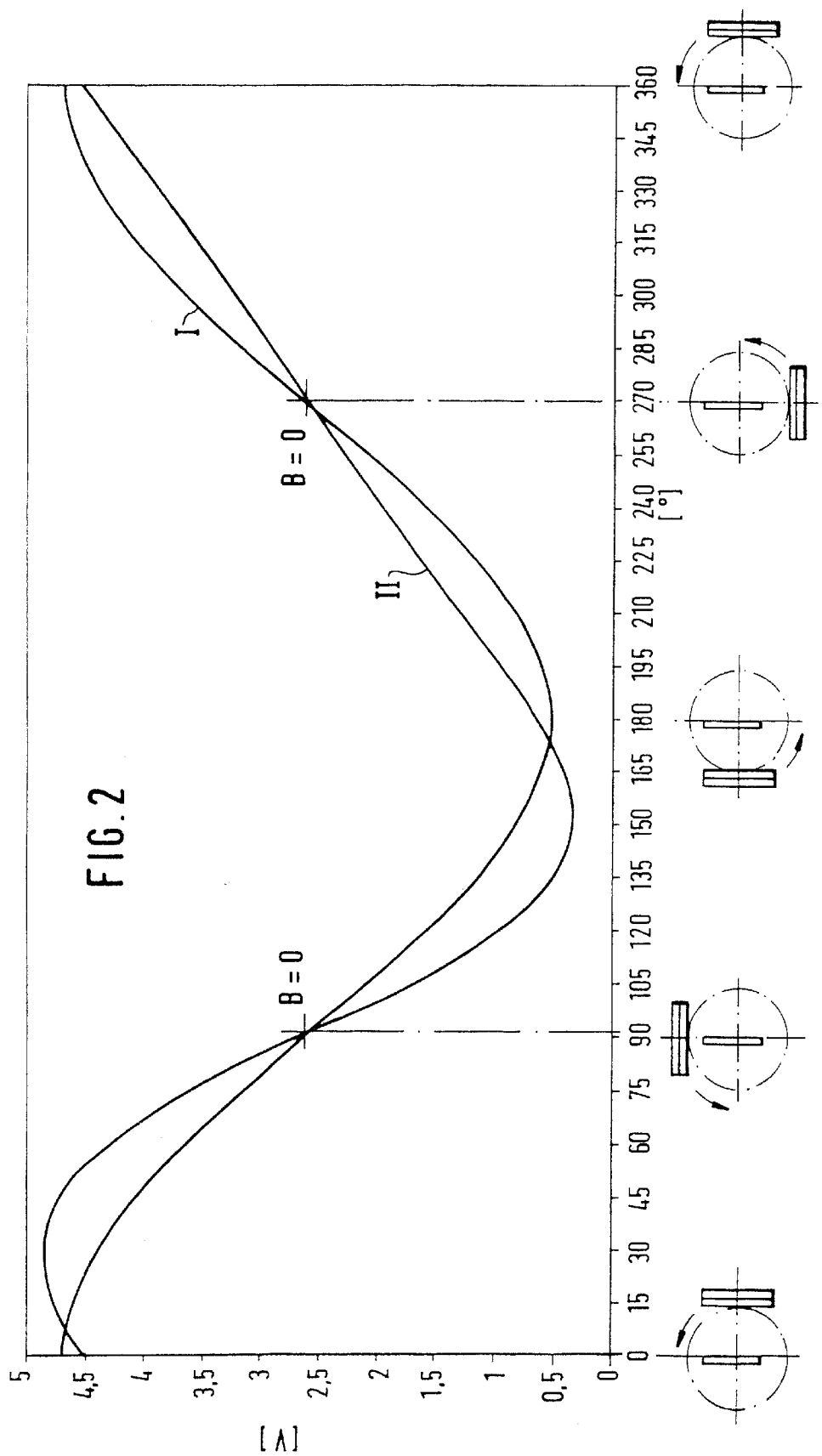

B = 0

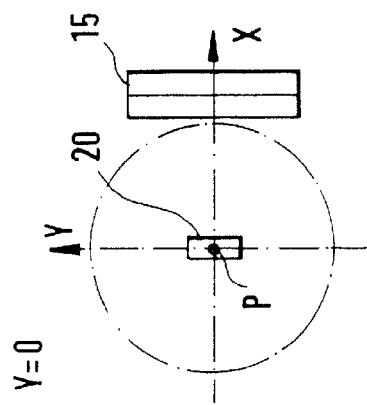
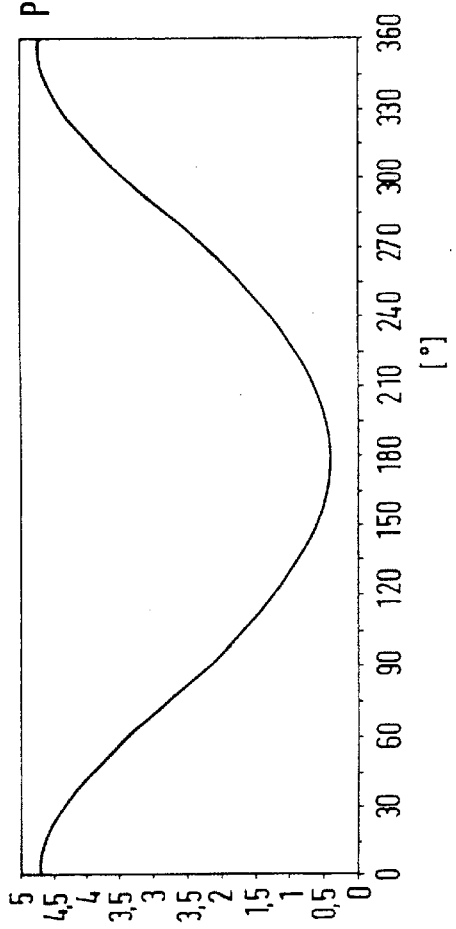
FIG. 5
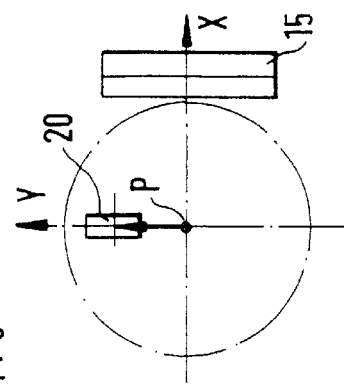
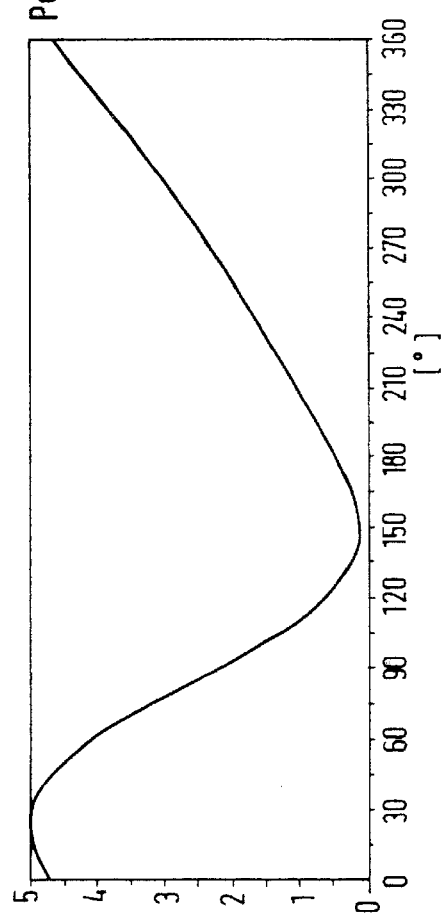
FIG. 6

MEASUREMENT DEVICE FOR THE NON-CONTACT DETECTION OF AN ANGLE OF ROTATION

PRIOR ART

The invention is based on a measuring instrument for contactless ascertainment of a rotation angle according to the preamble to claim 1. The prior art, for example DE 197 53 775.8 A1, has disclosed using flux conducting parts made of magnetically conductive material in these measuring instruments in order to guide the magnetic lines. But these measuring instruments are consequently relatively large and can only be partially incorporated into measuring systems. Furthermore, in this embodiment, the slope of the linear region of the measurement curve cannot be influenced to a sufficient degree.

In the sensor according to DE 197 12 833 A1, a permanent magnet is disposed on a magnet wheel which moves past a magnetoresistive sensor. In this instance, only short peaks in the measurement curve are produced, which are used as triggering or counting pulses.

DE 196 29 611 A1 describes a measuring instrument which has a number of stationary Hall elements. A rotor made of soft magnetic material is moved past these Hall elements so that the distance between each Hall element and the rotor continuously changes. Each Hall element has a permanent magnet rigidly attached to it, which generates the magnetic flux. For the determination of the measurement value, the rotor must consequently also be a flux conducting part.

In the rotation angle detector according to DE 40 14 885 A1, the permanent magnet has flux conducting parts so that between the poles of the magnet, a magnetic field is produced with magnetic flux lines that are as parallel as possible and a flux density that is as uniform as possible.

In the rotation angle sensor described in DE 196 35 159 A1, magnets are moved past one or more reed contacts, wherein the rotation angle can only be measured in steps.

ADVANTAGES OF THE INVENTION

The measuring instrument according to the invention, for contactless ascertainment of a rotation angle, with the characterizing features of claim 1, has the advantage over the prior art that by means of virtually arbitrary positioning of the magnetic field sensitive element which produces the output signal, a slope of the linear region of the measurement curve can be influenced. The linear region thus produced can be greater than 80°. A relatively small magnet can be used which is simply clipped or glued to the support plate of the rotor or can also be injection molded in a plastic. Assembly costs can be sharply reduced by eliminating the flux parts that are otherwise customary in contactless sensors. Large geometric tolerances in the magnet are permissible due to the design of the sensor itself. Since the magnet has a homogeneous magnetic field in the vicinity of the center of the Hall element, it is not susceptible to axial displacement and the accompanying tolerance fluctuations. The characteristic curve itself is composed of a steep region and a flat region so that large angles can be associated with the flat region and small angles can be associated with the steep region.

Advantageous modifications and improvements of the measuring instrument disclosed to claim 1 are possible by means of the steps taken in the dependent claims.

DRAWINGS

The exemplary embodiments of the invention are shown in the drawings and will be explained in detail in the subsequent description.

FIG. 1 shows a section through a schematic depiction of the sensor,

FIG. 2 shows a course of the output signal in Volts over a rotation angle of 360°, where the position of the permanent magnet in relation to an off center Hall element is shown at 90° intervals at the bottom.

Figure 4:
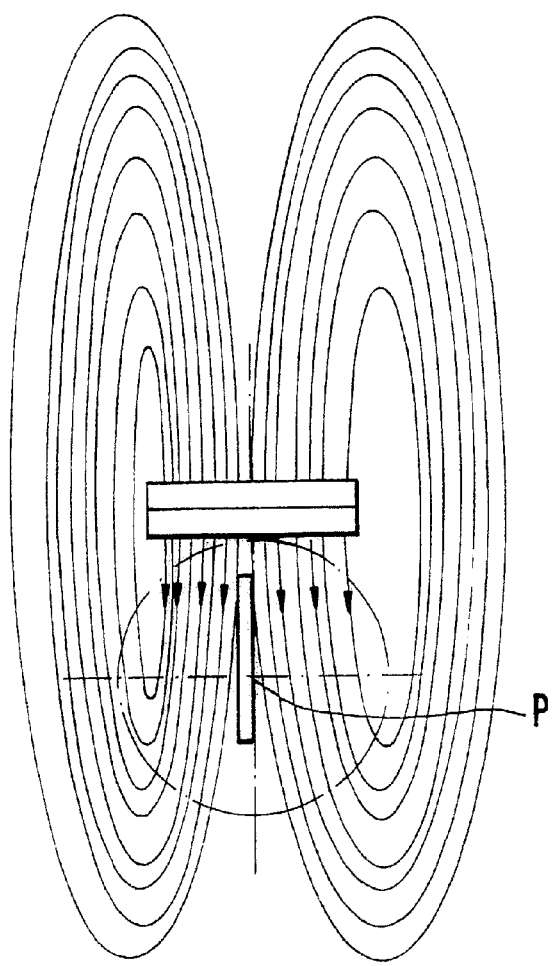

FIGS. 3 and 4, clarify the position of the maximal amplitude of the characteristic curve and the position of the neutral amplitude of the characteristic curve.

Figure 7:
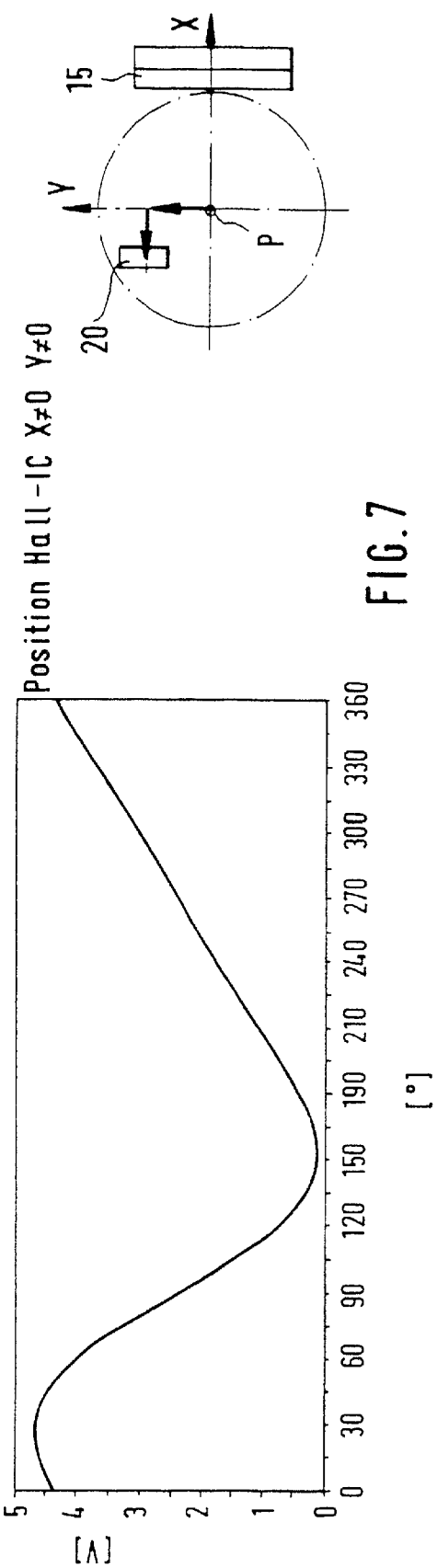

FIGS. 5, 6, and 7 show different positions of the magnetic field sensitive element in relation to the permanent magnet and the respectively associated course of the output signal over the rotation angle of 360°.

Figure 8:
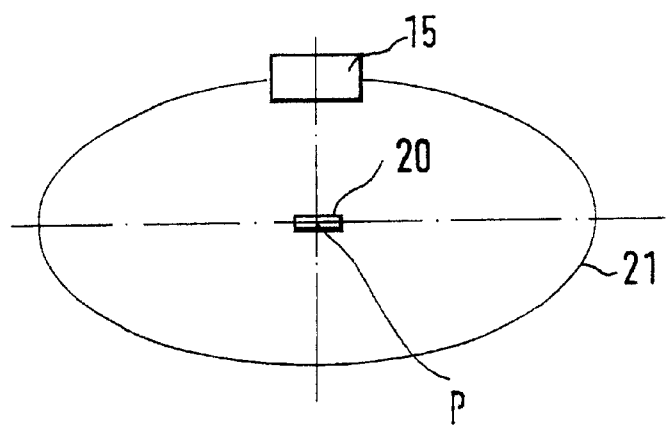

FIG. 8 shows another modification of the exemplary embodiment in which the magnet does not execute a circular motion around the center of the structure, but is disposed on an oval orbit and the Hall element is disposed centrally in the rotational axis.

Figure 9:
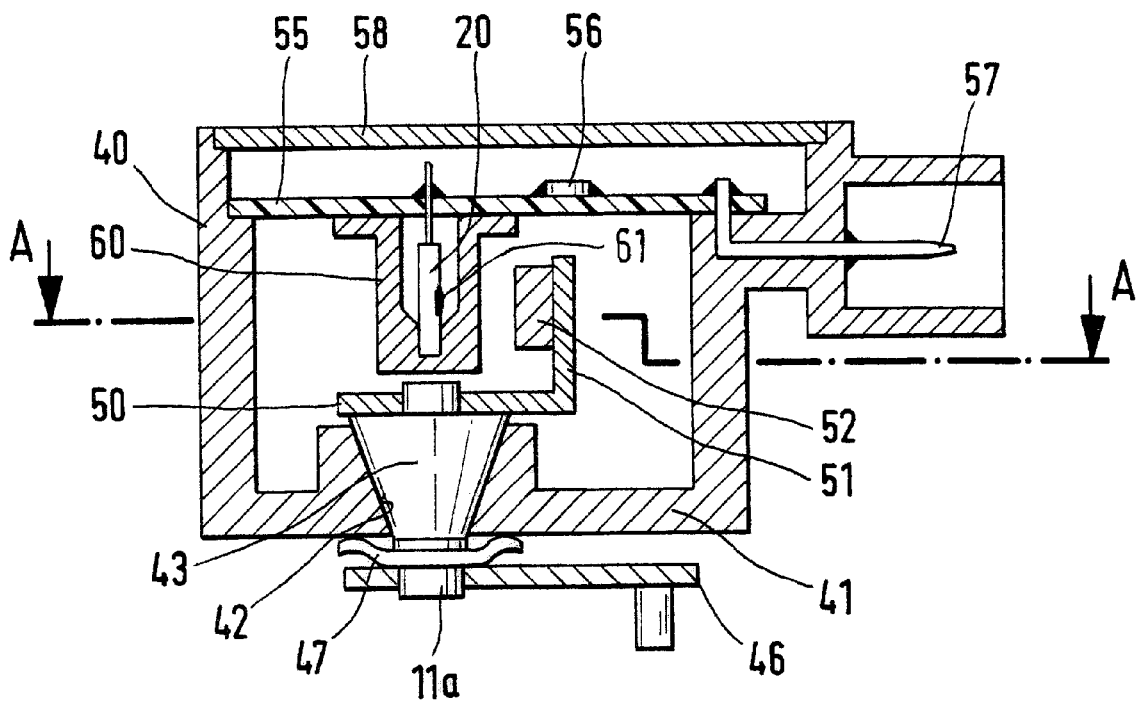

FIG. 9 is a longitudinal section depicting the incorporation of a sensor by means of a conical support into the housing of a throttle valve actuator.

Figure 10:
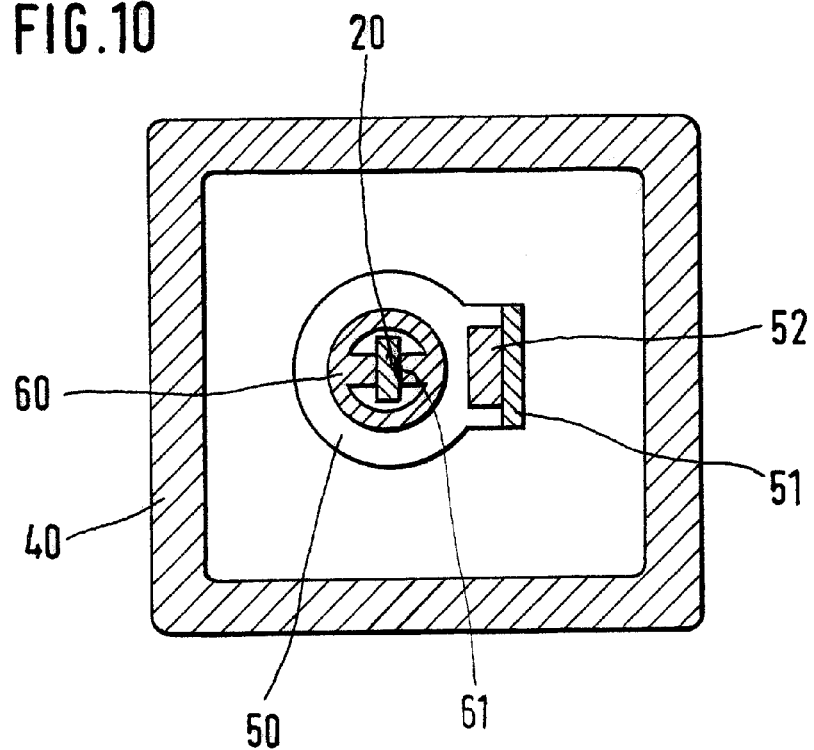

FIG. 10 is a section in the direction A—A according to FIG. 9.

DESCRIPTION OF THE EXEMPLARY EMBODIMENTS

In the Figs., a sensor is labeled with the reference numeral 10, which is connected with the aid of an axle 11 to a component, not shown, whose rotational motion is to be detected. A support plate 12 is placed centrally on the end face of the axle 11 and simultaneously serves as a rotor. At least the support plate 12 and in particular also the axle 11 are comprised of magnetically nonconductive material. The support plate 12 is embodied as a circular disk. A permanent magnet 15 is fastened for example to the edge of the support plate 12, spaced apart from the center point of the support plate 12, as shown in FIGS. 1 and 3. The permanent magnet 15 is embodied as planar, i.e. it does not have a curved shape which would fit the circular shape of the support plate 12. The permanent magnet 15 is disposed parallel to a plane 16 extending through the center point P of the support plate 12. In addition, the polarity of the permanent magnet 15 is aligned diametrically to the axle 11. In other words, the polarity extends perpendicular to the plane 16. Instead of a circular support disk, the permanent magnet 15 can also be fastened to an arm supported by the axle 11 or fastened in a cup which would consequently execute a circular motion. Furthermore, with the aid of a suspension 19, a magnetic field sensitive element 20 is disposed in stationary fashion above the center point P of the support plate 12, i.e. in the plane 16. In FIG. 1, and as is clearly shown in FIG. 3, the magnetic field sensitive element 20 is not disposed centrally above the center point but is shifted away from the center point P in the plane 16. For example, a photoresistance cell controlled by a magnetic field, magnetotransistors, magnetoresistive elements, or a Hall element can be used as the magnetic field sensitive element 20. In this connection, it is important that the magnetic field sensitive component have as linear as possible a dependence of its output signal on the magnetic induction B and a dependence of the angle of incidence of the magnetic flux.

It would be advantageous to use a Hall element with a number of measuring surfaces disposed in the plane 16 in order to produce an average. As a result, the sensor becomes less sensitive to shifts in the x and y directions, i.e. becomes less sensitive to tolerances.

FIG. 2 now shows the course of the output signal over a rotation angle of 360°. The curve II shown corresponds to the course of the output signal with an asymmetrical disposition of the magnetic field sensitive element 20 according to FIG. 1 or FIG. 3. In FIG. 2, the respective association of the magnetic field sensitive element 20 and the permanent magnet 15 is shown underneath the graph in angular positions spaced apart by 90° intervals. As is known, the output signal is based on the change in the magnetic induction B during the rotary motion. FIG. 3 shows the course of the field lines of the permanent magnet 15 when the magnetic induction B=max is produced in the magnetic field sensitive element 20. It is clear from FIG. 3 that virtually all of the magnetic field lines of the permanent magnet 15 pass through the magnetic field sensitive element 20 in an approximately perpendicular fashion. In contrast to this, FIG. 4 shows the orientation of the magnetic field sensitive element 20 in relation to the permanent magnet 15 when the magnetic induction B=0. It can be inferred from FIG. 4 that virtually all the field lines of the permanent magnet 15 are parallel to the magnetic field sensitive element 20 and have no components perpendicular to the magnetic field sensitive element 20. Whereas with the prior measuring method using magnetic flux parts, the change in the magnetic field intensity in the Hall element was evaluated, here the angle of incidence of the magnetic field lines on the measuring surface is evaluated. With an asymmetrical disposition of the Hall element, as is shown at the bottom in FIG. 2 and is also shown in FIGS. 1, 3, and 4, the permanent magnet 15 describes an elliptical or oval path in its motion around the Hall element 20 around its center point, i.e. around its magnetic field sensitive region. As a result, a perpendicular incidence of the magnetic field lines is only produced in the position shown in FIG. 3. In the other positions, the magnetic field lines strike the magnetic field sensitive region of the Hall element 20 at a particular angle. As is known, the respective perpendicularly extending portion here acts on the Hall element 20 after a component disassembly. The elliptical or oval motion of the permanent magnet 15 around the Hall element 20 now results in the fact that not only the angle of incidence of the magnetic flux lines but also, due to the above-mentioned component disassembly, a change in the field intensity takes place due to the changes in spacing. The angle of incidence and consequently the perpendicularly extending portion of magnetic field lines changes depending on the rotation. If the Hall element 20 is then asymmetrically oriented as shown in FIGS. 1 to 4, then the curve II shown in FIG. 2 is produced, with a linearly rising region and a relatively steeply rising region. The linearly rising region is produced when the Hall element 20 is moving away from the permanent magnet, i.e. when the distance is increasing due to the elliptical or oval motion. Because of the asymmetrical disposition, a linear course in the measurement curve II can thereby be achieved which extends for more than 90°. In contrast to this, the steeply increasing region of the curve II is obtained when the Hall element 20 is moved toward the permanent magnet 15, i.e. when the distance between the Hall element 20 and the permanent magnet 15 is decreasing due to the elliptical or oval motion.

In all of the exemplary embodiment, including the ones that follow, the permanent magnet 15 is embodied as planar. In this connection it can be rectangular or quadriform. In addition, it can be rounded at the ends. But it would also be conceivable, for example, for it to have a round or oval form.

FIG. 5 shows a modification in which the Hall element 20 is disposed in the center point P, i.e. in the center of the axle. If a coordinate system were to be drawn onto the support plate 12, with the x- and y axes, with the intersecting point, i.e. the zero point, disposed in the center of the axle 11 and/or the support plate 12, then the Hall element 20 would have the coordinates x=0 and y=0. Next to this in FIG. 5, the measurement curve of the output signal of the Hall element 20 is depicted over a rotation angle of 360°. The course of this curve corresponds to a sine function. The curve in FIG. 5 does not have any flat or steep region with which it would deviate from the sine function since the rotational motion of the permanent magnet 15 around the Hall element 20 is a circular motion. For comparison, this measurement curve is also shown in FIG. 2, labeled with the reference numeral I.

By contrast, in FIG. 6, the Hall element 20 is shifted in the y direction from the zero point, i.e. from the center point P, while still being disposed at the zero point in the x direction, and it consequently has the coordinates x=0 and y?0. This position of the Hall element corresponds largely to the above-described type shown in FIGS. 1 to 4. Because of the elliptical course of the rotary motion now being produced between the Hall element 20 and the permanent magnet 15, the graph shown in FIG. 6 also has the flat and steep regions of the measurement curve present in FIG. 2.

In the embodiment according to FIG. 7, the Hall element 20 is now shifted on the x axis and on the y axis, i.e. it has the coordinates x?0 and y?0 and is consequently disposed, for example, in the $4^{th}$ quadrant. The course of the measurement curve shown beside it once again has a steep region and a flat region. The measurement curve can now be influenced due to the shifting of the Hall element in relation to the permanent magnet 15. A flat rise in one region of the measurement curve is necessary in order to measure large angles whereas a steep region is preferable for determining small angles. It is therefore possible to adapt the sensor to the respective measurement in a particularly simple manner.

In the preceding exemplary embodiments, the permanent magnet 15, with the aid of a support, described a circular motion around the axle 11 and because of the asymmetrical disposition of the Hall element 20 or because of its being fixed in relation to the axle 11 or in relation to the permanent magnet 15, it executed an elliptical or oval course of motion. In the exemplary embodiment according to FIG. 8, the permanent magnet 15 is now moved in an elliptical or oval path 21 and the Hall element 20 is disposed centrally on the axle 11, i.e. in the center point P of the axle 11. However, it is important here that the permanent magnet 15 be disposed in a planar fashion and consequently not have any curved shape adapted to the support plate.

In all of the exemplary embodiments, it is important that at least during the rotational motion, the magnetic field sensitive element 20 be disposed in the magnetic field of the magnet and inside the orbit of the magnet.

Since the sensor 10 is very small and is inexpensive to assemble, it can be particularly easily integrated into systems, i.e. a tank level module a throttle device, a gas pedal module, a transmission control, etc. Naturally, it can also be used as an independent sensor for detecting rotation angles. When it is used, it is particularly advantageous that the permanent magnet can be cast into the rotation axle or into a projection of the rotation axle and that the Hall element can be fastened to a housing part.

In the exemplary embodiment according to FIG. 9, an approximately cup-shaped housing, for example of a throttle valve actuator, is labeled with the reference numeral 40. In the bottom 41 of the housing 40, there is a bore 42 which in connection with the projection 43 on the bottom 41 of the housing 40, has a conical structure. A shaft 11a or the projection of a shaft is inserted into this bore 42 from the opening of the housing 40. The shaft 11a is embodied to correspond with the conical shape of the bore 42 so that the shaft 11a is embodied conically at least in the projection 43 disposed in the bore 42. Underneath the bottom 41 of the housing 40, the shaft 11a protrudes into a driver 46 by means of which the rotary motion is transmitted from a component to be monitored to the shaft 11a. Between the driver 46 and the outside of the bottom 41, there is a spring 47 which presses the shaft 11a with the conical projection 43 into the conical region of the bore 42. For cost reasons, the spring 47 can also be a component of the driver 46, which is embodied as a lever or gear. If the driver is made of plastic, then the springs can be injection molded in place, if they are comprised of metal, then the spring arms can be appropriately curved. A magnet holder 50 that serves as a rotor is non-rotatably connected to the opposite end of the shaft 11a. As is also shown in FIG. 10, the magnet holder 50 has a projection 51 embodied in the axial direction of the shaft 11a, to which a permanent magnet 52 is fastened. The permanent magnet 52 has a radial polarity as in the remaining exemplary embodiments. The magnet holder 50 and possibly also the shaft 11a are comprised of magnetically nonconductive material. A printed circuit board 55 is inserted into the opening of the housing 40 and contains the usual components 56 of an electric circuit and by means of which the components 56 are connected to the plug connector 57. The opening of the housing 40 is also closed by a cover 58, which protects the interior of the housing 40 from moisture and other damaging external influences. On the underside of the printed circuit board 55, there is a Hall element 20, which is connected to the components 56 of the circuit. Furthermore, the Hall element 20 is encompassed by a support 60, which is disposed on the underside of the printed circuit board 50 and in which the end of the Hall element 20 is embedded. As a result, the Hall element 20 cannot fall out or get damaged when there are vibrating movements or other mechanical influences. As in the preceding exemplary embodiments, the sensitive surface(s) 61 of the Hall element 20 are not disposed centrally over the center point of the shaft so that here, too, the permanent magnet 52 describes an oval or elliptical path around the sensitive surfaces 61 of the Hall element 20. For applications with small angle ranges, i.e. approximately in the range from −15°< <15°, the sensitive surfaces 61 can also be positioned centrally. This corresponds to a circular path.

However, an asymmetrical disposition is also possible in this angular range. Furthermore, during the rotary motion, the Hall element 20 is always disposed in the magnetic field of the permanent magnet 52. In this exemplary embodiment as well, the permanent magnet revolves around the Hall element so that the Hall element is always disposed in the magnetic field, which changes with the rotary motion. With sensor principles which are radially and axially sensitive as is the case here, or with sensors that have a particular precision, the particularly advantageous support makes them inexpensive to produce. The linearity and the measurement precision is better than is the case with slide bearings, for example. With this support, there is no longer the radial play that otherwise occurs as a result of different manufacturing tolerances and different expansions when there are temperature fluctuations.

What is claimed is:

1. A measuring instrument (10) for contactless ascertainment of a rotation angle, with a rotor (11, 12) which supports a magnet (15), and a magnetic field sensitive element (20) for producing a measurement signal, characterized in that the rotor (11, 12) is comprised of magnetically nonconductive material, that the magnet (15) is embodied as planar and is disposed parallel to a plane (16) passing through the axle (11) of the rotor (12), that the polarity of the magnet (15) is diametrical to the axle (11), that the measuring instrument (10) does not have any magnetic flux conducting parts, and that the magnetic field sensitive element (20) and the magnet (15) are disposed so that during the rotary motion, the element (20) is disposed in the magnetic field of the magnet (15).

2. The measuring instrument according to claim 1, characterized in that the magnetic field sensitive element (20) and the magnet (15) are disposed in relation to each other so that they describe an oval motion in relation to one another.

3. The measuring instrument according to claim 2, characterized in that the magnetic field sensitive element (20) and the magnet (15) are disposed in relation to each other so that they describe an elliptical motion in relation to one another.

4. The measuring instrument according to claim 1, characterized in that the magnet (15) has a rectangular shape with rounded corners.

5. The measuring instrument according to claim 1, characterized in that the magnet (15) has an oval shape or round shape.

6. The measuring instrument according to claim 1, characterized in that the magnetic field sensitive element (20) is disposed off center in relation to the axle (11).

7. The measuring instrument according to claim 1, characterized in that the magnetic field sensitive element (20) is disposed off center in the plane (16).

8. The measuring instrument according to claim 1, characterized in that the magnetic field sensitive element (20) is disposed in the region of one quadrant of the rotor (12).

9. The measuring instrument according to claim 1, characterized in that the rotor (12) is circular.

10. The measuring instrument according to claim 1, characterized in that the magnetic field sensitive element (20) is a Hall element which has a number of measuring surfaces in order to produce an average.

11. The measuring instrument according to claim 1, characterized in that a shaft (11a) is disposed on the rotor (12) and, with the aid of a conical support, is supported in an opening (42) of a housing (40).

12. The measuring instrument according to claim 11, characterized in that a projection (43) of the shaft (11a) is conically embodied and that the projection (43) is supported in the conically embodied opening (42) of the housing (40).

\* \* \* \* \*